(12) United States Patent
Takahashi et al.

(10) Patent No.: US 8,677,089 B2
(45) Date of Patent: Mar. 18, 2014

(54) STORAGE APPARATUS AND STORAGE SYSTEM

(75) Inventors: Hideaki Takahashi, Yokohama (JP);
Mana Tanaka, Yokohama (JP);
Hideyuki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 460 days.

(21) Appl. No.: 13/030,192

(22) Filed: Feb. 18, 2011

(65) Prior Publication Data

US 2011/0202737 A1 Aug. 18, 2011

(30) Foreign Application Priority Data

Feb. 18, 2010 (JP) ................... 2010-034118
Feb. 17, 2011 (JP) ................... 2011-032636

(51) Int. Cl.
*G06F 13/00* (2006.01)
*G06F 13/28* (2006.01)

(52) U.S. Cl.
USPC ............... 711/162; 711/161; 711/E12.103

(58) Field of Classification Search
None
See application file for complete search history.

(56) References Cited

U.S. PATENT DOCUMENTS

2006/0212747 A1* 9/2006 Okamoto et al. ............. 714/6

FOREIGN PATENT DOCUMENTS

JP 10-133926 5/1998
JP 2003-223286 8/2003

* cited by examiner

*Primary Examiner* — Eric S Cardwell
(74) *Attorney, Agent, or Firm* — Staas & Halsey LLP

(57) ABSTRACT

A storage apparatus includes: an associating unit that associates a first memory area in which data to be copied are stored and a second memory area of a destination storage apparatus to which the data are copied; a detecting unit that detects a start or an end of copying the data from the first memory area to the second memory area associated by the associating unit; and an access control unit that controls access to the first memory area and the second memory area based on a result of detection performed by the detecting unit.

6 Claims, 15 Drawing Sheets

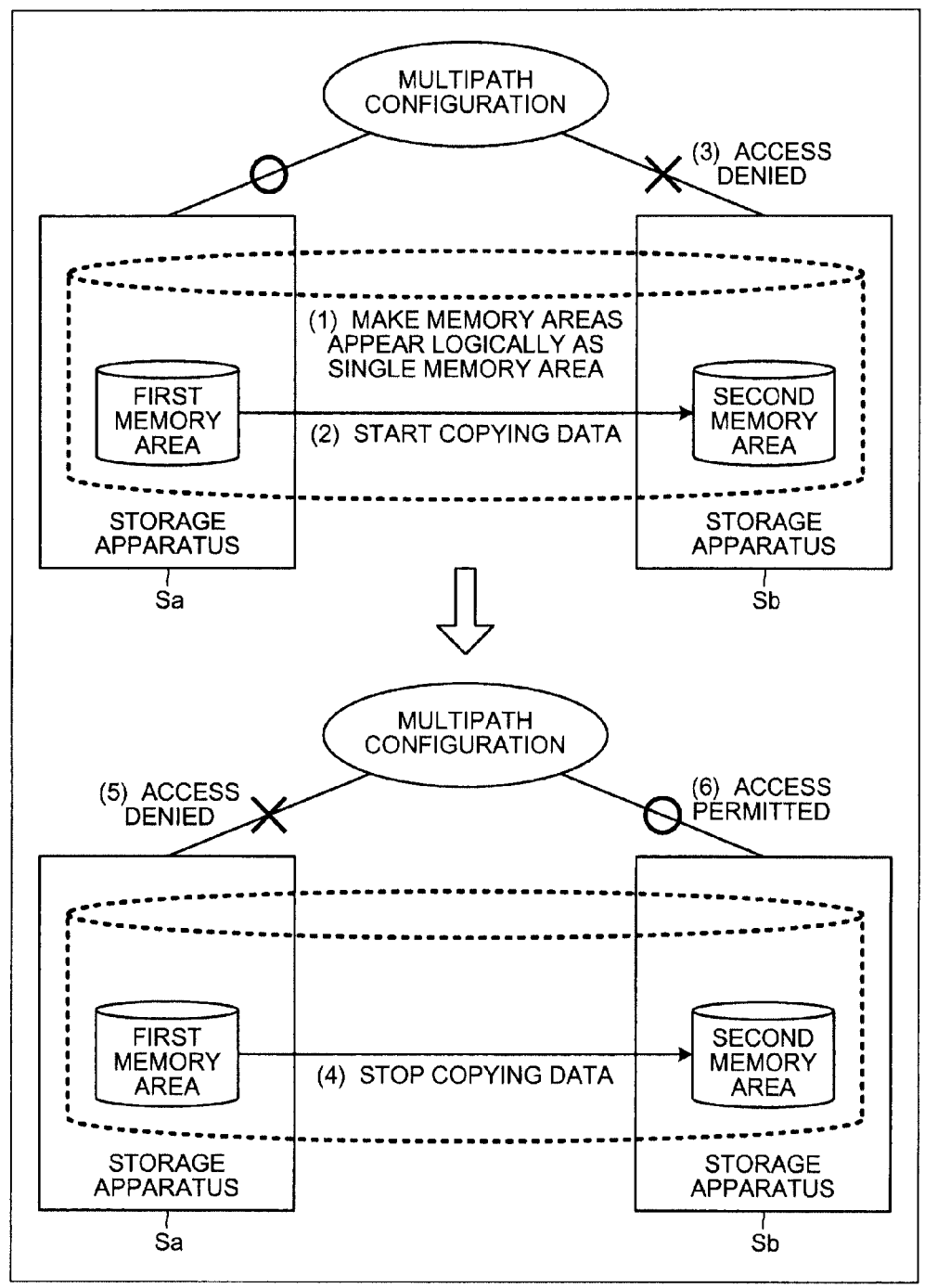

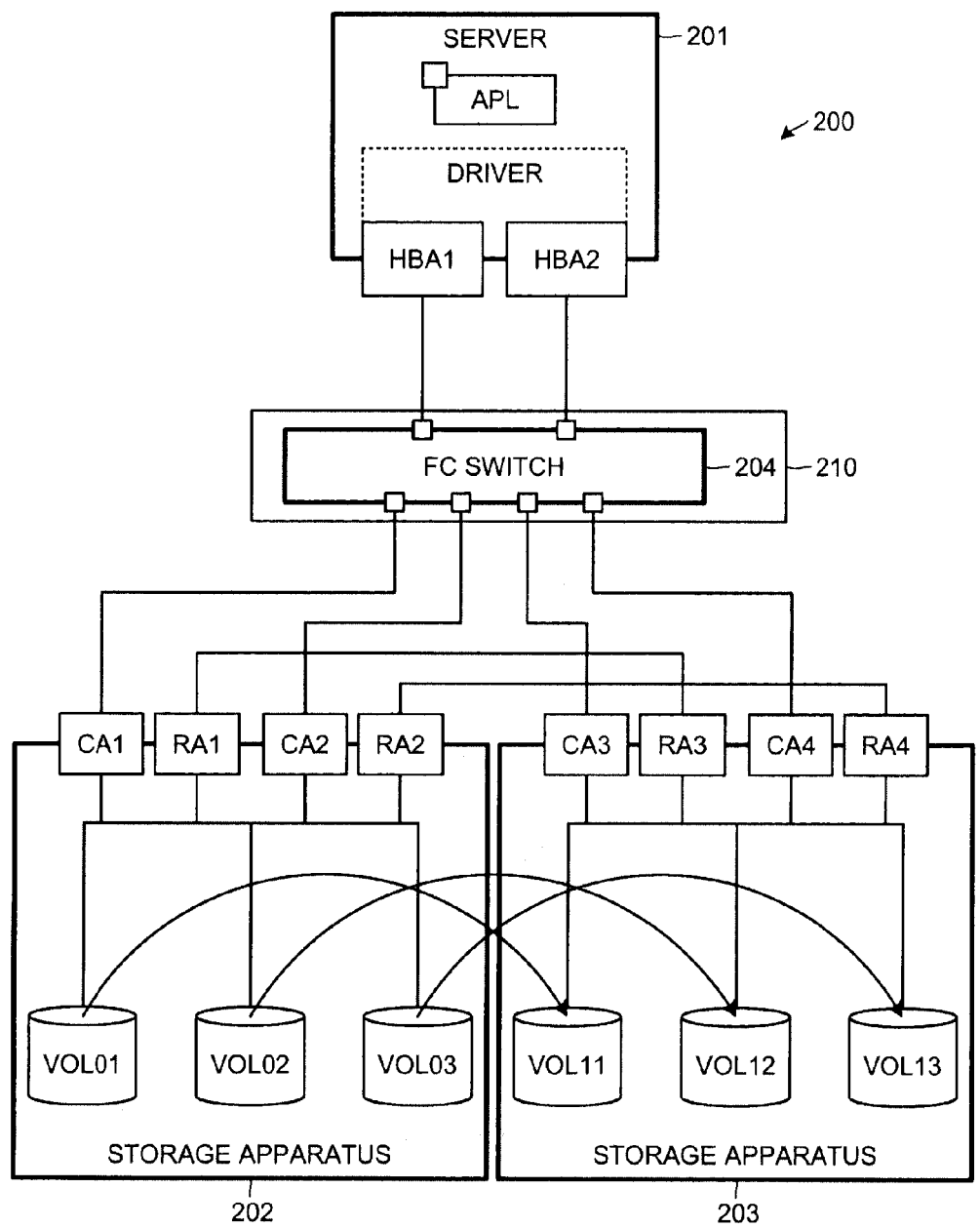

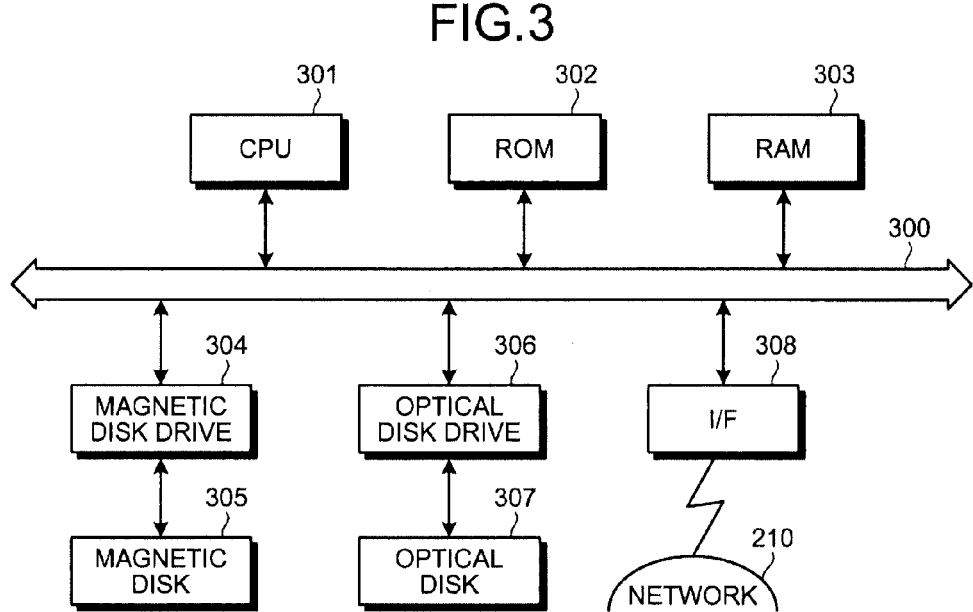
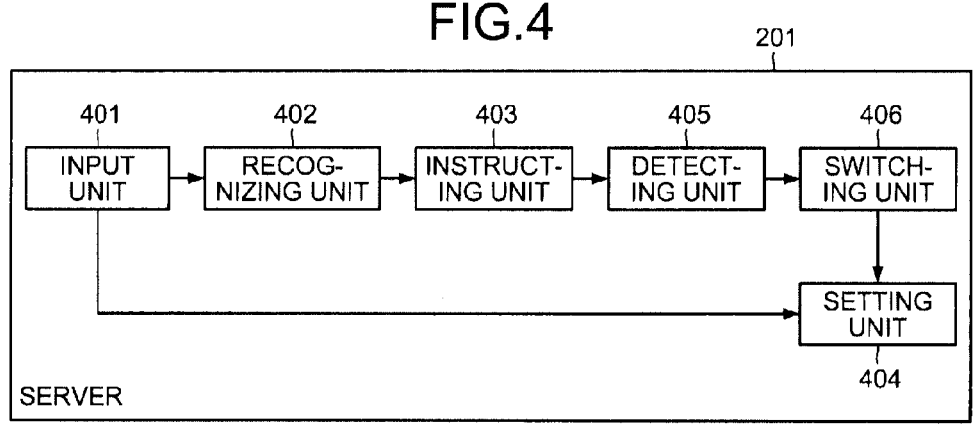

FIG.6

VOLUME STATE MANAGEMENT TABLE 600

| MULTIPATH VOLUME NUMBER | INFORMATION IDENTIFIER | ENCLOSURE IDENTIFIER | LUN | LV NUMBER | REFERENCE PROHIBITING FLAG | UPDATE PROHIBITING FLAG | COPY FLAG | SESSION ID | COPY DIRECTION |
|---|---|---|---|---|---|---|---|---|---|
| PVOL01 | REFERENCE ENCLOSURE | STORAGE_A_001 | 0 | VOL01 | OFF | OFF | OFF | - | - |
|  | PARTNER ENCLOSURE | - | - | - |  |  | OFF | - | - |
| PVOL02 | REFERENCE ENCLOSURE | STORAGE_A_001 | 1 | VOL02 | OFF | OFF | OFF | - | - |
|  | PARTNER ENCLOSURE | - | - | - |  |  | OFF | - | - |
| PVOL03 | REFERENCE ENCLOSURE | STORAGE_A_001 | 2 | VOL03 | OFF | OFF | OFF | - | - |
|  | PARTNER ENCLOSURE | - | - | - |  |  | OFF | - | - |

600-1, 600-2, 600-3

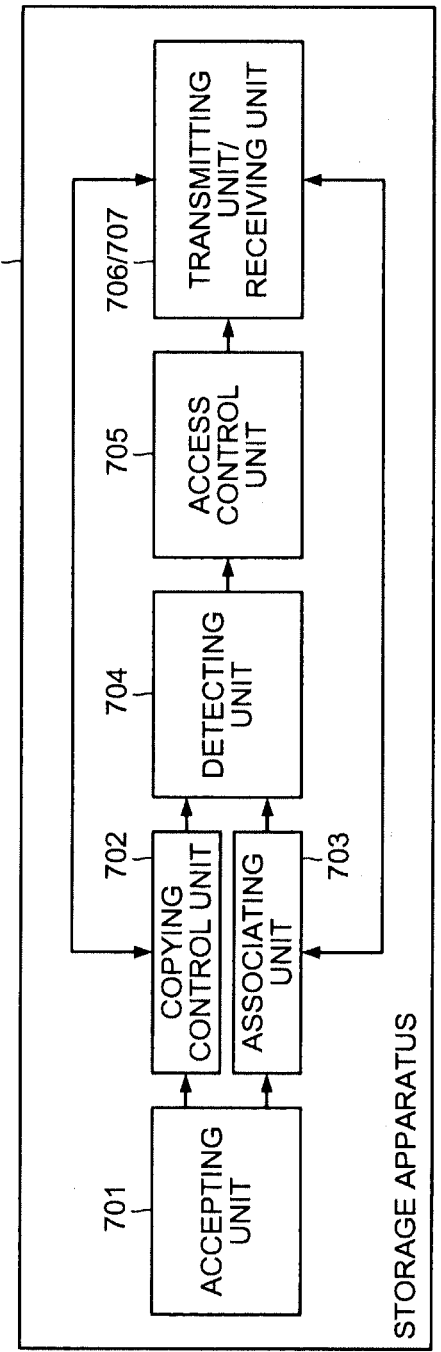

FIG. 8B (3)

| MULTIPATH VOLUME NUMBER | INFORMATION IDENTIFIER | ENCLOSURE IDENTIFIER | LUN | LV NUMBER | REFERENCE PROHIBITING FLAG | UPDATE PROHIBITING FLAG | COPY FLAG | SESSION ID | COPY DIRECTION |
|---|---|---|---|---|---|---|---|---|---|
| PVOL01 | REFERENCE ENCLOSURE | STORAGE_A_001 | 0 | VOL01 | OFF | OFF | ON | 1 | TRANSMISSION |
|  | PARTNER ENCLOSURE | STORAGE_B_011 | 0 | VOL11 | ON | ON | ON | 1 | RECEPTION |
| PVOL02 | REFERENCE ENCLOSURE | STORAGE_A_001 | 1 | VOL02 | OFF | OFF | ON | 2 | TRANSMISSION |
|  | PARTNER ENCLOSURE | STORAGE_B_011 | 1 | VOL12 | ON | ON | ON | 2 | RECEPTION |
| PVOL03 | REFERENCE ENCLOSURE | STORAGE_A_001 | 2 | VOL03 | OFF | OFF | ON | 3 | TRANSMISSION |
|  | PARTNER ENCLOSURE | STORAGE_B_011 | 2 | VOL13 | ON | ON | ON | 3 | RECEPTION |

(4)

| MULTIPATH VOLUME NUMBER | INFORMATION IDENTIFIER | ENCLOSURE IDENTIFIER | LUN | LV NUMBER | REFERENCE PROHIBITING FLAG | UPDATE PROHIBITING FLAG | COPY FLAG | SESSION ID | COPY DIRECTION |
|---|---|---|---|---|---|---|---|---|---|
| PVOL01 | REFERENCE ENCLOSURE | STORAGE_A_001 | 0 | VOL01 | ON | ON | ON | 1 | TRANSMISSION |
|  | PARTNER ENCLOSURE | STORAGE_B_011 | 0 | VOL11 | OFF | OFF | ON | 1 | RECEPTION |
| PVOL02 | REFERENCE ENCLOSURE | STORAGE_A_001 | 1 | VOL02 | ON | ON | ON | 2 | TRANSMISSION |
|  | PARTNER ENCLOSURE | STORAGE_B_011 | 1 | VOL12 | OFF | OFF | ON | 2 | RECEPTION |
| PVOL03 | REFERENCE ENCLOSURE | STORAGE_A_001 | 2 | VOL03 | ON | ON | ON | 3 | TRANSMISSION |
|  | PARTNER ENCLOSURE | STORAGE_B_011 | 2 | VOL13 | OFF | OFF | ON | 3 | RECEPTION |

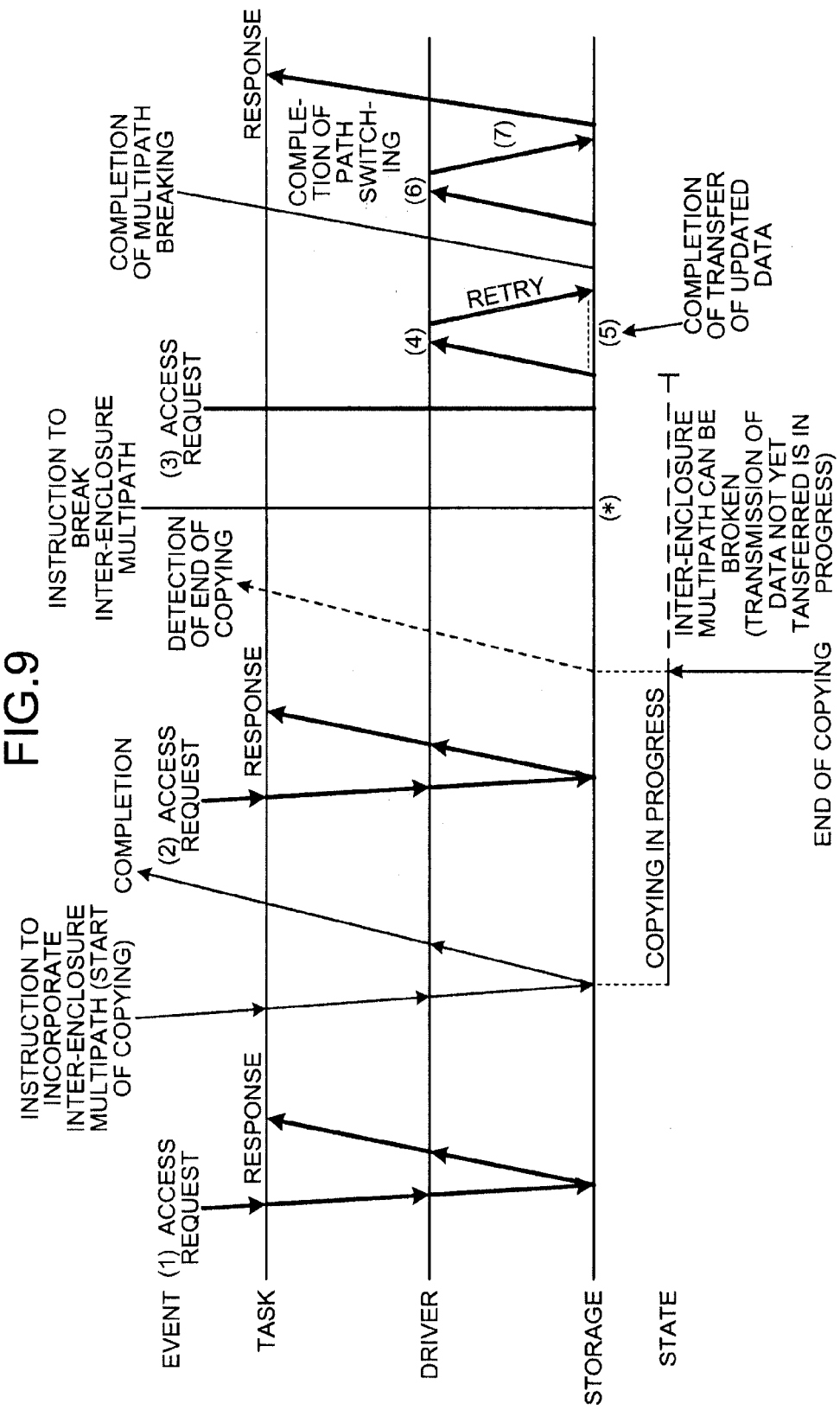

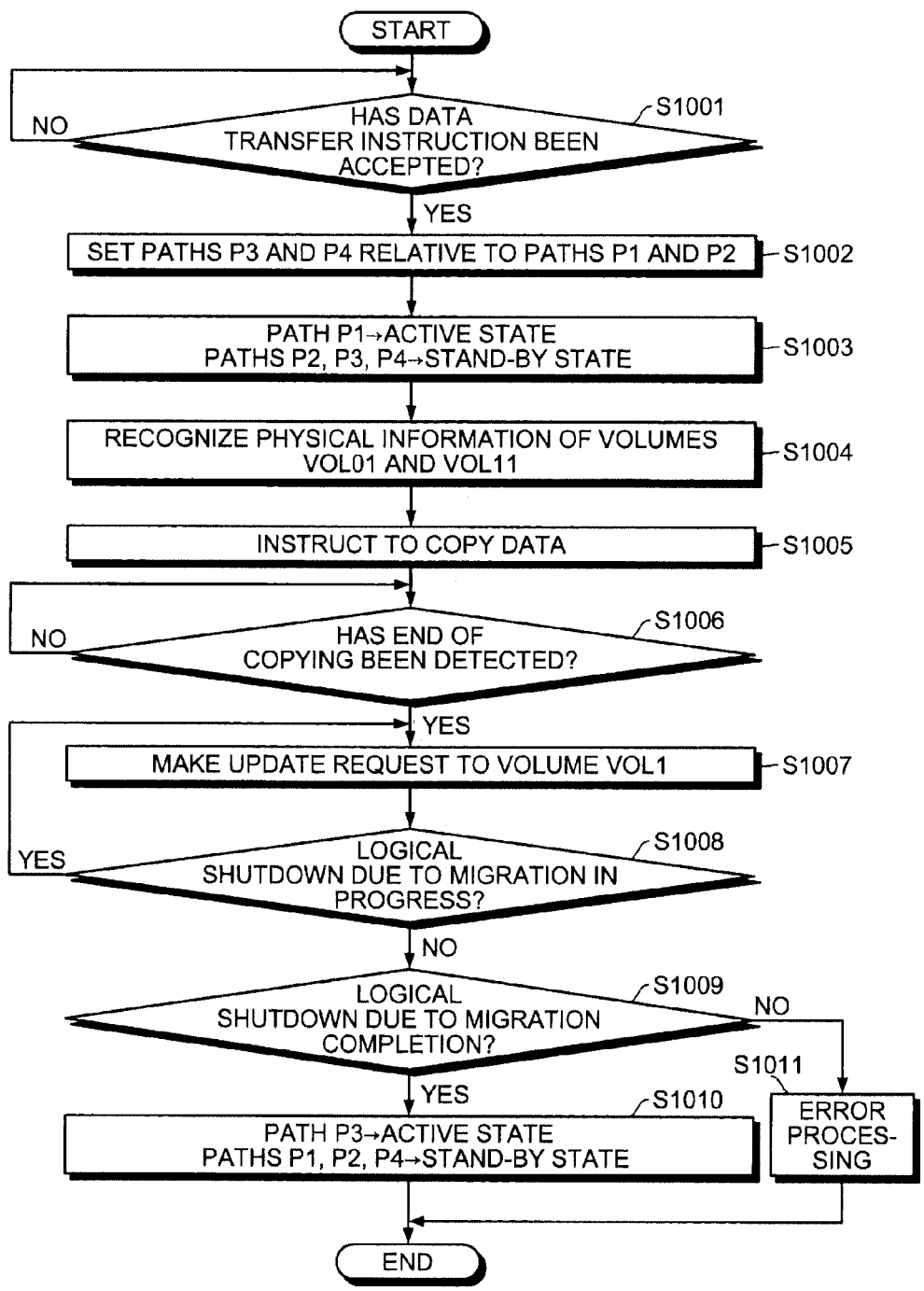

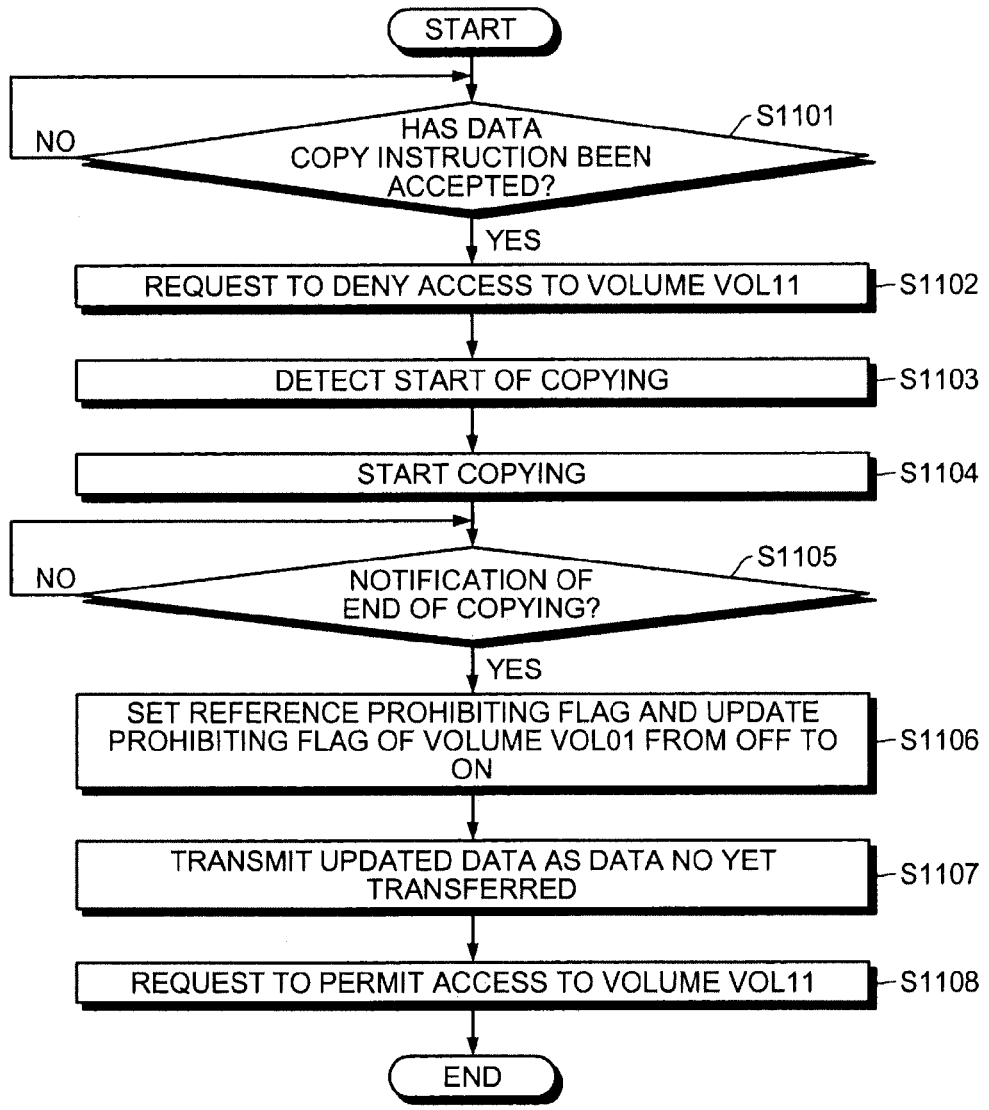

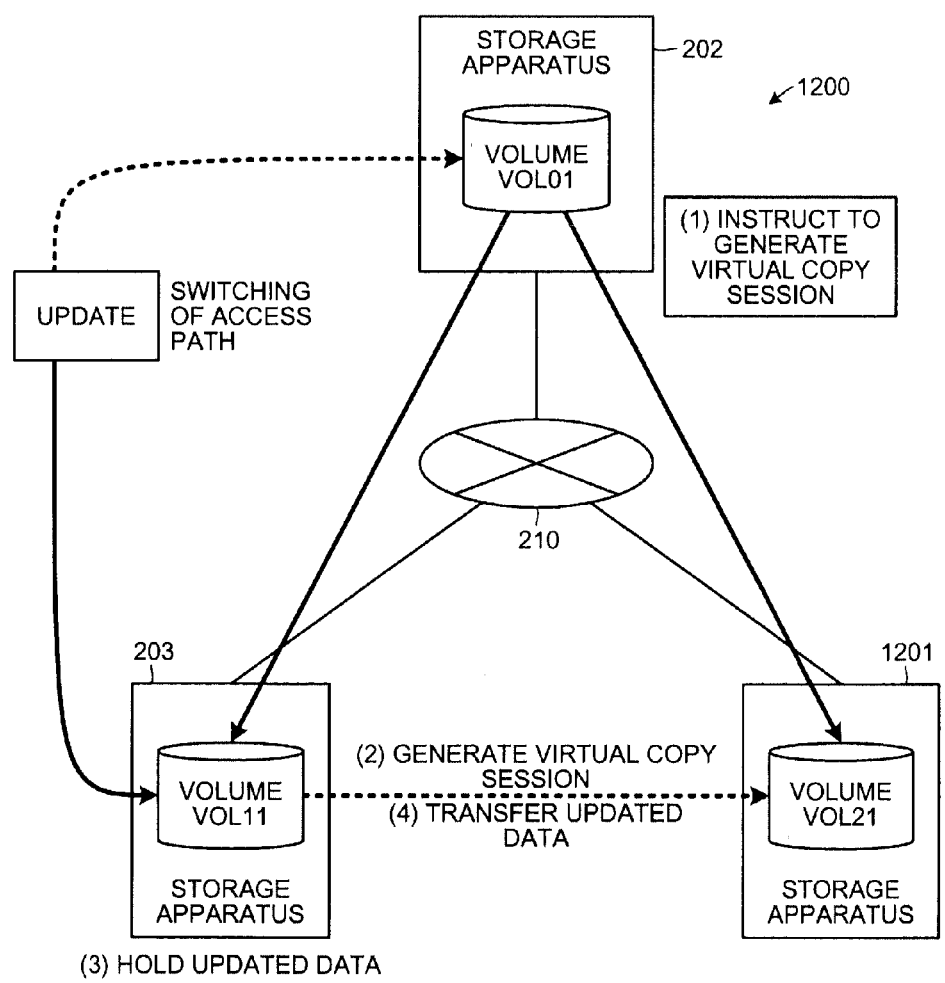

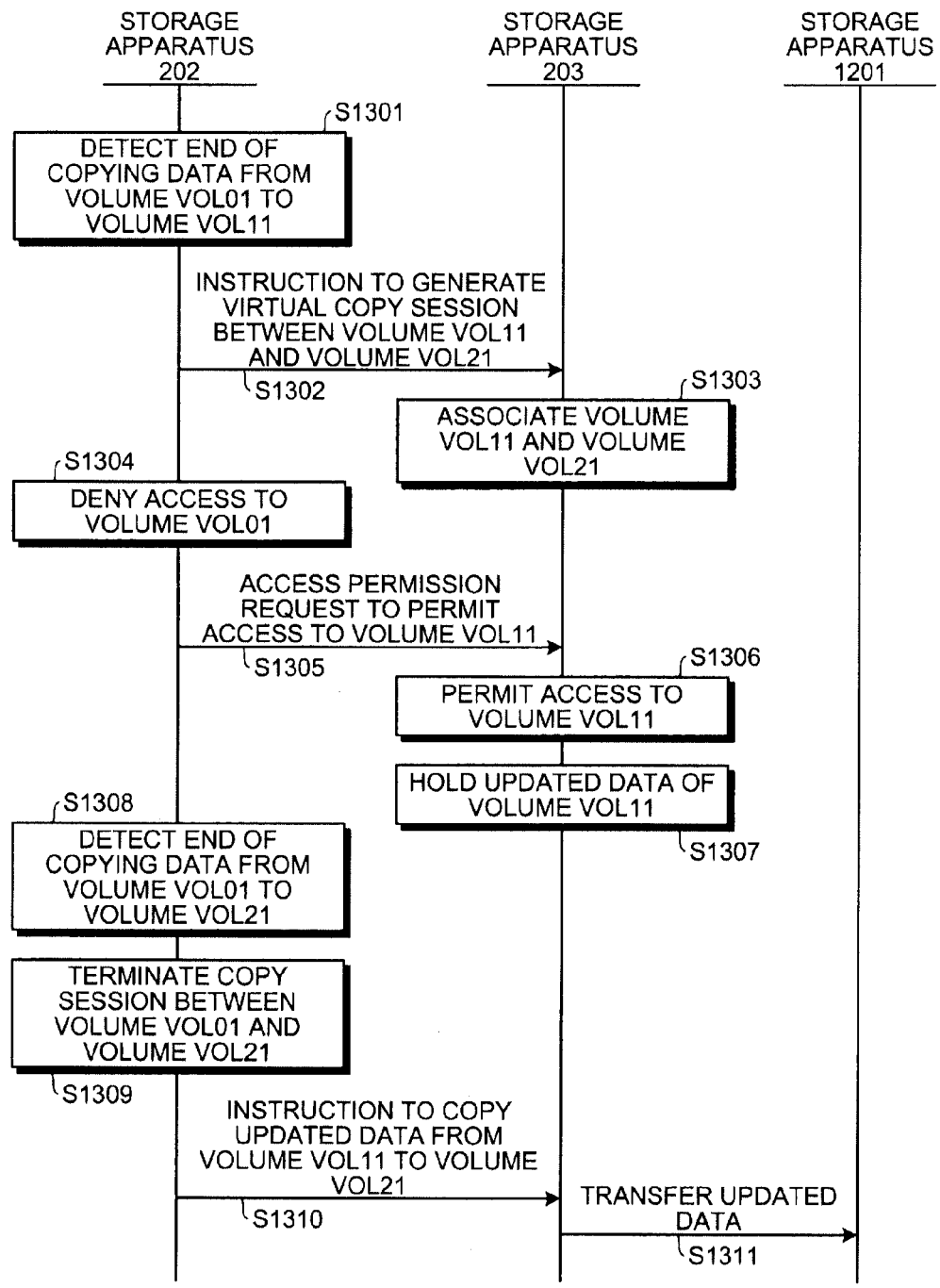

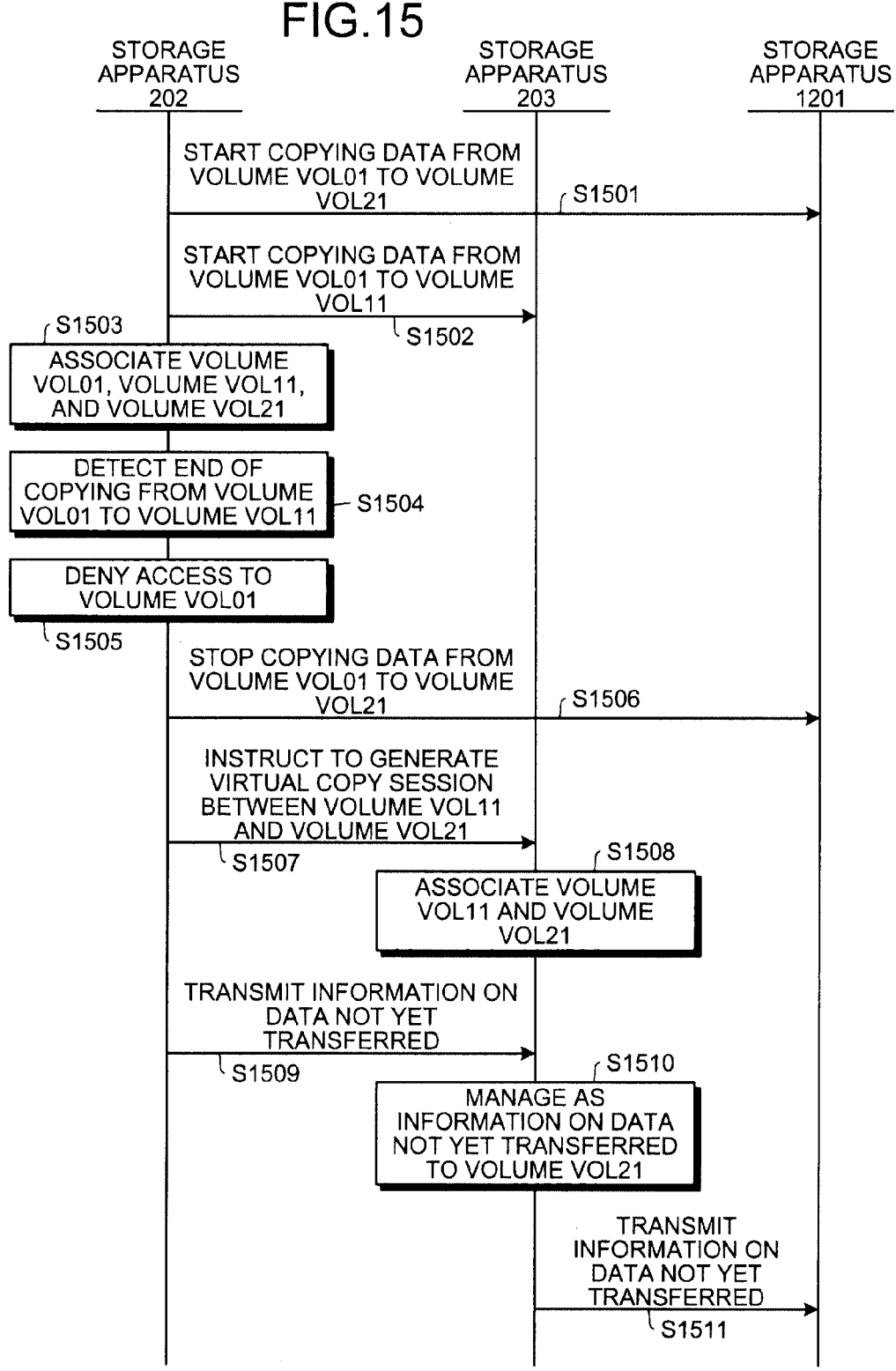

STORAGE APPARATUS AND STORAGE SYSTEM

CROSS REFERENCE TO RELATED APPLICATIONS

This application is based upon and claims the benefit of priority of the prior Japanese Patent Applications No. 2010-034118, filed on Feb. 18, 2010, and No. 2011-032636, filed on Feb. 17, 2011, the entire contents of which are incorporated herein by reference.

FIELD

The embodiments discussed herein are related to a storage apparatus and a storage system.

BACKGROUND

Conventionally, a technique for a storage apparatus to autonomously manage data stored therein is known (see, for example, Japanese Laid-Open Patent Publication No. 2003-223286). Specifically, the conventional apparatus requests other storage apparatus to copy a copy unit divided from its own storage area, based on the storage status of the other storage apparatus.

A technique for restoring mirrored disks storing the same data is also known (see, for example, Japanese Laid-Open Patent Publication No. H10-133926). Specifically, every time a write operation to a first mirrored disk occurs while access to a second disk is suspended, the conventional system stores block information indicating that data have been written into the first disk. During restoration of the second disk, the conventional system copies the data stored in the first disk and indicated by the block information to the second disk.

However, the conventional techniques described above have a problem that when the enclosure to be accessed by an application running on a server is switched from the current enclosure to a newly-added enclosure, the application has to be temporarily suspended for data transfer between the enclosures.

For example, the access path has to be switched so that an operation executed by the application on the server using the logical unit number (LUN) on the current enclosure is executed using the LUN on the new enclosure. In other words, it is necessary to change the logical volume mounted by the application from the LUN on the current enclosure to that on the new enclosure, and make the logical file configuration of the new enclosure match with that of the current enclosure. In this case, the operation is inevitably interrupted since the LUN on the current enclosure cannot be unmounted during access.

SUMMARY

According to an aspect of an embodiment, a storage apparatus includes: an associating unit that associates a first memory area in which data to be copied are stored and a second memory area of a destination storage apparatus to which the data are copied; a detecting unit that detects a start or an end of copying the data from the first memory area to the second memory area associated by the associating unit; and an access control unit that controls access to the first memory area and the second memory area based on a result of detection performed by the detecting unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram of an example of a data transfer method according to a first embodiment.

FIG. 2 is a diagram of a system configuration of a storage system.

FIG. 3 is a block diagram of a hardware configuration of a server etc.

FIG. 4 is a block diagram of a functional configuration of the server.

FIG. 6 is a diagram of an exemplary content of a volume state management table.

FIG. 7 is a block diagram of a functional configuration of storage apparatuses.

FIGS. 8A and 8B are diagrams of an example of a change in the content of the volume state management table.

FIG. 9 is a diagram of an example of a task access during data transfer.

FIG. 10 is a flowchart of an exemplary procedure of a data transfer performed by the server.

FIG. 11 is a flowchart of an exemplary procedure of a copying performed by the storage apparatus.

FIG. 12 is a diagram of an example of a backup method according to a second embodiment.

FIG. 13 is a sequence diagram of an exemplary procedure of a backup according to the second embodiment.

FIG. 15 is a sequence diagram of an exemplary procedure of a backup according to a third embodiment.

DESCRIPTION OF EMBODIMENT(S)

Figure 5:
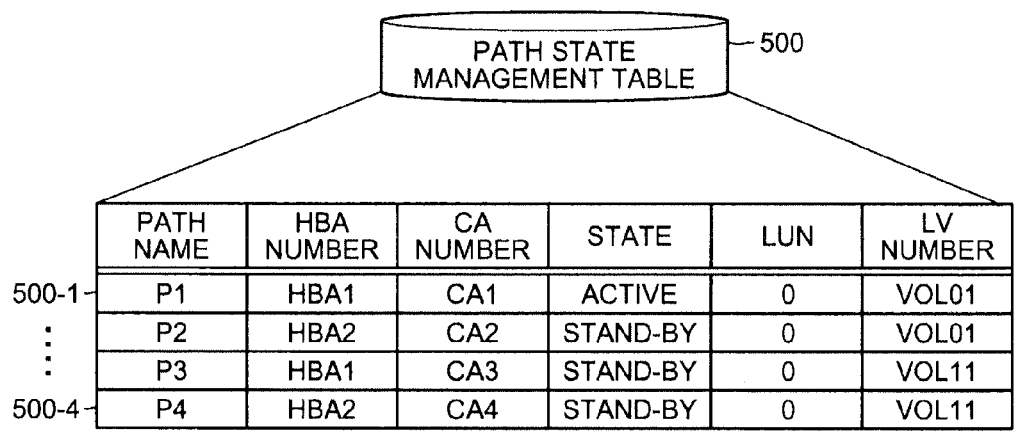
FIG. 5 is a diagram of an exemplary content of a path state management table.

Preferred embodiments of the present invention will be explained with reference to the accompanying drawings.

FIG. 1 is a diagram of an example of a data transfer method according to a first embodiment of the present invention. A first memory area of a storage apparatus Sa is a source memory area that stores data to be transferred. A second memory area of a storage apparatus Sb is a destination memory area.

According to the data transfer method, (1) a multipath is configured over the storage apparatuses Sa and Sb to make the first and second memory areas of the same capacity appear logically as a single memory area. (2) The storage apparatus Sa detects a start of copying data from the first memory area to the second memory area.

(3) When the storage apparatus Sa detects the start of copying, the storage apparatus Sb is controlled to deny access to the second memory area. (4) The storage apparatus Sa detects an end of copying data from the first memory area to the second memory area.

(5) When the storage apparatus Sa detects the end of copying, the storage apparatus Sa is controlled to deny access to the first memory area. (6) When the storage apparatus Sa detects the end of copying, the storage apparatus Sb is controlled to permit access to the second memory area.

As described above, according to the data transfer method, access to the first and second memory areas is controlled in coordination with the start and end of copying data from the first memory area to the second memory area. Thus, the first memory area is accessed during the copying, and the access path is switched to the second memory area in coordination with the end of copying, thereby enabling data transfer between enclosures without interrupting access to the data to be transferred.

FIG. 2 is a diagram of a system configuration of a storage system 200 according to the first embodiment. The storage system 200 includes a server 201, storage apparatuses 202 and 203, and a fiber channel (FC) switch 204.

In the storage system 200, the server 201, the storage apparatuses 202 and 203, and the FC switch 204 are connected via a network 210 such as a local area network (LAN), a wide area network (WAN), a storage area network (SAN), and the Internet. In FIG. 2, a SAN with the FC switch 204 is taken as an example.

The server 201 includes a driver for the storage apparatuses 202 and 203. The server 201 also includes an application ("APL" in FIG. 2) that executes a task by accessing memory areas of the storage apparatuses 202 and 203, and a command to configure an inter-enclosure multipath volume. The command to configure the inter-enclosure multipath volume instructs the storage apparatuses 202 and 203 to transfer data.

Each of the storage apparatuses 202 and 203 includes a memory area that stores data, and controls access to the memory area. The storage apparatuses 202 and 203 autonomously copy data between enclosures. The FC switch 204 is a relay device that relays data between the server 201 and the storage apparatuses 202 and 203.

VOL01 to VOL03 are volumes to which the memory area of the storage apparatus 202 is assigned. VOL11 to VOL13 are volumes to which the memory area of the storage apparatus 203 is assigned. Volumes VOL01 to VOL03 store data (task data) to be transferred to volumes VOL11 to VOL13, respectively.

A volume is a unit for managing the memory areas of the storage apparatuses 202 and 203. For example, the entire hard disk, a partition obtained by dividing the hard disk, or a combination of hard disks may be treated as one volume.

Configuration between the server 201 and the storage apparatuses 202 and 203 is a multipath configuration. Specifically, path P1 is provided between a host bus adaptor HBA1 of the server 201 and a channel adaptor CA1 of the storage apparatus 202. Path P2 is provided between a host bus adaptor HBA2 of the server 201 and a channel adaptor CA2 of the storage apparatus 202.

Path P3 is provided between the host bus adaptor HBA1 of the server 201 and a channel adaptor CA3 of the storage apparatus 203. Path P4 is provided between the host bus adaptor HBA2 of the server 201 and a channel adaptor CA4 of the storage apparatus 203.

The world wide name (WWN) of the channel adaptor CA1 is set as "WWN-CA1." The WWN of the channel adaptor CA2 is set as "WWN-CA2." The WWN of the channel adaptor CA3 is set as "WWN-CA3." The WWN of the channel adaptor CA4 is set as "WWN-CA4."

Here, a multipath configuration is taken as an example of the configuration between the server 201 and each of the storage apparatuses 202 and 203. However, it is sufficient to configure a multipath at least over the storage apparatuses 202 and 203, and each of the storage apparatuses 202 and 203 does not have to have a multipath configuration.

However, if a multipath is configured between the server 201 and each of the storage apparatuses 202 and 203, access can be made by switching from one path (for example, path P1) to another path (for example, path P2) even when a failure occurs in one path. Thus, suspension of access due to path failure can be prevented, thereby ensuring the reliability of the system. The system performance can be also improved by load distribution between the paths (for example, paths P1 and P2).

FIG. 3 is a block diagram of a hardware configuration of the server 201 and the storage apparatuses 202 and 203 depicted in FIG. 2 (collectively called as "server etc."). The server etc. includes a central processing unit (CPU) 301, a read-only memory (ROM) 302, a random access memory (RAM) 303, a magnetic disk drive 304, a magnetic disk 305, an optical disk drive 306, an optical disk 307, and an interface (I/F) 308, respectively connected by a bus 300.

The CPU 301 governs overall control of the server etc. The ROM 302 stores therein programs such as a boot program. The RAM 303 is used as a work area of the CPU 301. The magnetic disk drive 304, under the control of the CPU 301, controls the reading and writing of data with respect to the magnetic disk 305. The magnetic disk 305 stores therein data written under control of the magnetic disk drive 304.

The optical disk drive 306, under the control of the CPU 301, controls the reading and writing of data with respect to the optical disk 307. The optical disk 307 stores therein data written under control of the optical disk drive 306, the data being read by a computer.

The I/F 308 is connected to the network 210 such as a LAN, a WAN, and the Internet through a communication line, and connected to other apparatuses through the network 210. The I/F 308 administers an internal interface with the network 210 and controls the input/output of data from/to external apparatuses. For example, a cannel adapter, a remote adapter, and a device adapter may be employed as the I/F 308.

FIG. 4 is a block diagram of a functional configuration of the server 201. The server 201 includes an input unit 401, a recognizing unit 402, an instructing unit 403, a setting unit 404, a detecting unit 405, and a switching unit 406. The functional units (the input unit 401 to the switching unit 406) are implemented by, for example, the CPU 301 executing a program stored in the memory device such as the ROM 302, the RAM 303, the magnetic disk 305, and the optical disk 307 depicted in FIG. 3, or the I/F 308. Processing results of the functional units (the input unit 401 to the switching unit 406) are stored in, for example, the memory device such as the RAM 303, the magnetic disk 305, and the optical disk 307.

The input unit 401 accepts an instruction to transfer data from a first volume of the storage apparatus 202 to a second volume of the storage apparatus 203. The first volume is, for example, volumes VOL01 to VOL03 depicted in FIG. 2. The second volume is, for example, volumes VOL11 to VOL13 depicted in FIG. 2.

For example, the input unit 401 may accept a data transfer instruction input by a user through an input device (not depicted) of the server 201, or may receive a data transfer instruction from an external computer. The data transfer instruction includes, for example, device names of the first and second volumes (for example, "/dev/dsk/clt0d0s0") recognized by the operating system (OS) of the server 201.

The recognizing unit 402 recognizes physical information of the first and second volumes when the data transfer instruction is accepted. Physical information is information for identifying the first and second volumes, and includes, for example, enclosure identifier, LUN, and logical volume (LV) number.

The enclosure identifier is an identifier of the storage apparatuses 202 and 203. The LUN is an identifier of a volume recognized by the server 201. The LUN is assigned to, for example, a path for accessing the first and second volumes. The LV number is an identifier of a volume (for example, VOL01) recognized by the storage apparatuses 202 and 203.

For example, the recognizing unit 402 identifies route information and the LUN of the first and second volumes based on the device names included in the data transfer instruction. Route information includes, for example, path name, HBA number, and CA number identifying path for accessing the first and second volumes.

The recognizing unit 402 specifies the identified route information and LUN, and inquires the storage apparatuses 202 and 203 about physical information of the first and second volumes. For example, the recognizing unit 402 inquires the storage apparatuses 202 and 203 about the physical information of the first and second volumes using the inquiry command of the small computer system interface (SCSI).

A case is described where the first volume is "volume VOL01" (FIG. 2) and the physical information thereof is recognized. In this case, the recognizing unit 402 identifies route information and the LUN of volume VOL01, based on the device name included in the data transfer instruction.

The recognizing unit 402 specifies the identified route information and LUN, and inquires the storage apparatus 202 about the physical information of volume VOL01. The recognizing unit 402 receives the physical information of volume VOL01 from the storage apparatus 202, and recognizes the physical information of volume VOL01.

The instructing unit 403 instructs the storage apparatus 202 to copy data from the first volume to the second volume. For example, the instructing unit 403 sends an instruction to copy data from the first volume to the second volume to the storage apparatus 202 via the network 210. The data copy instruction includes, for example, the physical information of the first and second volumes recognized by the recognizing unit 402.

The setting unit 404 sets paths for accessing the first and second volumes when the data transfer instruction is accepted. For example, the setting unit 404 specifies path name, HBA number, and CA number identified by the device name, and sets paths for accessing the first and second volumes.

If a path for accessing the first volume is set in advance, the setting unit 404 sets a new path for accessing the second volume relative to the path. In the case of FIG. 2, the setting unit 404 sets paths P3 and P4 for accessing volumes VOL11 to VOL13 relative to the existing paths P1 and P2 for accessing volumes VOL01 to VOL03.

Here, a case is described where the data transfer instruction is issued on a volume-to-volume basis and paths are set on a volume-to-volume basis. Alternatively, if the data transfer instruction is issued on an enclosure-to-enclosure basis, for example, paths may be set on an enclosure-to-enclosure basis.

The setting unit 404 also sets states of paths for accessing the first and second volumes. For example, the setting unit 404 sets a path for accessing the first volume to an active state, while a path for accessing the second volume to a stand-by state.

The active state is a state of a path (access path) that is actually used as a route in an active/stand-by configuration. The stand-by state is a state of a path that will be used as an alternative route in the active/stand-by configuration when the path in the active state becomes unusable due to failure, etc. That is, the path in the stand-by state is not used as a route for data transmission/reception.

Here, a path is set to the active state or the stand-by state. Alternatively, a path may be set to a load-sharing state. In the load-sharing state, all paths are used so that loads of paths in the multipath configuration become equivalent. The result of setting is stored in, for example, a path state management table 500 depicted in FIG. 5.

FIG. 5 is a diagram of an exemplary content of the path state management table. The path state management table 500 includes fields of path name, HBA number, CA number, state, LUN, and LV number. Path state information 500-1 to 500-4 on paths P1 to P4 are stored as records, with each field being set with information.

The path name is a name of a path. The HBA number is an identifier of an HBA connected to the path. The CA number is an identifier of a CA connected to the path. The state is a state of the path. The LUN is an identifier of a volume to be accessed recognized by the server 201. The LV number is an identifier of a volume to be accessed recognized by each of the storage apparatuses 202 and 203. The LV number is the LV number recognized by the recognizing unit 402.

Here, new paths P3 and P4 for accessing volume VOL11 are set relative to the existing paths P1 and P2 for accessing volume VOL01. Among paths P1 to P4, path P1 is set to the active state while paths P2 to P4 are set to the stand-by state.

Referring back to FIG. 4, the detecting unit 405 detects the end of copying data from the first volume to the second volume after the data copy instruction. For example, the detecting unit 405 detects the end of copying by regularly inquiring the storage apparatus 202 or the storage apparatus 203 about the progress of the copying.

Upon detecting the end of copying, the detecting unit 405 may notify the storage apparatus 202 of the end of copying as a request to break the mirroring of the first and second volumes. Thus, the storage apparatus 202 can determine that the mirroring of the first and second volumes can be broken.

The switching unit 406 switches the volume to be accessed (access path) from the first volume to the second volume based on the result of detection. The access path is a path that is actually used for accessing the first volume or the second volume. In the initial state, a path for accessing the first volume (for example, path P1) is set as the access path.

For example, when the end of copying is detected, the switching unit 406 controls the setting unit 404 to set the path for accessing the first volume to the stand-by state and set a path for accessing the second volume to the active state. Thus, the access path can be switched from the first volume to the second volume.

As will be described later, the switching unit 406 sets the path for accessing the first volume to the stand-by state. When "logical shutdown due to completion of migration" is notified from the storage apparatus 202, the switching unit 406 may set the path for accessing the second volume to the active state.

If the path for accessing the first volume is in the load-sharing state, the switching unit 406 sets the path for accessing the first volume to the stand-by state and sets the path for accessing the second volume to the load-sharing state. Specifically, the WWN of the path for accessing the first volume may be replaced with the WWN of the path for accessing the second volume.

Here, an existing volume is specified as the second volume. Alternatively, for example, the second volume may be automatically generated by the storage apparatuses 202 and 203 by specifying an arbitrary volume of the destination storage apparatus 203.

For example, the instructing unit 403 sends an instruction to copy data from the first volume to the arbitrary volume to the storage apparatus 202. The storage apparatus 202 recognizes the destination storage apparatus 203 based on physical information of the arbitrary volume included in the data copy instruction.

The storage apparatus 202 instructs the storage apparatus 203 to generate the second volume of the same capacity as the first volume. The storage apparatus 203 incorporates the second volume therein so that the second volume can be accessed through the same channel adaptor CA as the arbitrary volume. In this case, physical information of the second volume is sent to the server 201 via the storage apparatus 202.

The functions of the recognizing unit 402, the setting unit 404, and the switching unit 406 are implemented by, for example, the driver included in the server 201. The functions of the instructing unit 403 and the detecting unit 405 are implemented by, for example, the command of the server 201 to configure the inter-enclosure multipath volume.

A content of a volume state management table 600 used by the storage apparatuses 202 and 203 depicted in FIG. 2 is described. Here, the content of the volume state management table 600 used by the source storage apparatus 202 is described.

FIG. 6 is a diagram of an exemplary content of the volume state management table. The volume state management table 600 includes fields of multipath volume number, information identifier, enclosure identifier, LUN, LV number, reference prohibiting flag, update prohibiting flag, copy flag, session ID, and copy direction. Volume state information 600-1 to 600-3 are stored as records, with each field being set with information.

The multipath volume number is an identifier of a multipath volume configured over enclosures. The information identifier is an identifier of a volume of the reference enclosure or the partner enclosure in the multipath volume. The enclosure identifier is an identifier of the storage apparatuses 202 and 203.

The LUN is an identifier of a volume recognized by the server 201. The LV number is an identifier of a volume recognized by the storage apparatuses 202 and 203. The reference prohibiting flag is a flag indicating whether to deny access for referring to the content of a volume. The reference prohibiting flag is set to "OFF" when access is permitted, and set to "ON" when access is denied (prohibited).

The update prohibiting flag is a flag indicating whether to deny access for updating the content of a volume. The update prohibiting flag is set to "OFF" when access is permitted, and set to "ON" when access is denied (prohibited). The reference prohibiting flag and the update prohibiting flag are set to "OFF" in the initial state.

The copy flag is a flag indicating whether a copy session with a partner volume constituting the inter-enclosure multipath is present. The copy flag is set to "ON" when a copy session is present, and set to "OFF" when no copy session is present. The copy flag is set to "OFF" in the initial state. The session ID is an identifier of the copy session. The copy direction is information indicating whether the enclosure is on the transmission side or the reception side of data to be copied.

Taking multipath volume PVOL01 as an example, for the volume of the reference enclosure with the enclosure identifier of "STORAGE_A_001," the LUN is set to "0," the LV number is set to "VOL01," and the reference prohibiting flag and the update prohibiting flag are set to "OFF." Information on a volume of the partner enclosure in the multipath volume PVOL01 is not yet set.

FIG. 7 is a block diagram of a functional configuration of the storage apparatuses 202 and 203. Each of the storage apparatuses 202 and 203 includes an accepting unit 701, a copying control unit 702, an associating unit 703, a detecting unit 704, an access control unit 705, a transmitting unit 706, and a receiving unit 707. The functional units (the accepting unit 701 to the receiving unit 707) are implemented by, for example, the CPU 301 executing a program stored in the memory device such as the ROM 302, the RAM 303, the magnetic disk 305, and the optical disk 307 depicted in FIG. 3, or the I/F 308.

Processing results of the functional units (the accepting unit 701 to the receiving unit 707) are stored in, for example, the memory device such as the RAM 303, the magnetic disk 305, and the optical disk 307. Focusing on the source storage apparatus 202, details of processing performed by the functional units (the accepting unit 701 to the receiving unit 707) are described.

The accepting unit 701 accepts an instruction to copy data from the first volume that stores data to be copied to the second volume of the storage apparatus 203. For example, the accepting unit 701 accepts the data copy instruction by receiving the data copy instruction from the server 201 via the network 210. The data copy instruction includes, for example, physical information of the first and second volumes.

The copying control unit 702 copies data from the first volume to the second volume when the data copy instruction is accepted. For example, using a mirroring method, the copying control unit 702 controls the transmitting unit 706 to transfer data of the first volume to the storage apparatus 203 via the remote adaptors RA1 and RA2 depicted in FIG. 2. The copying control unit 702 of the storage apparatus 203 stores data transferred from the storage apparatus 202 into the second volume. The data transfer method to be employed may be synchronous or asynchronous transfer.

The associating unit 703 associates the first volume and the second volume of the storage apparatus 203 when the data copy instruction is accepted. For example, the associating unit 703 associates and manages physical information of the first volume and that of the second volume.

The result of association is stored in, for example, the volume state management table 600 depicted in FIG. 6. The content of the volume state management table 600 that stores the result of association is described.

Figure 8A:

FIGS. 8A and 8B are diagrams of an example of a change in the content of the volume state management table. In FIG. 8A(1), the enclosure identifier, the LUN, and the LV number of the partner enclosure are set for each of multipath volumes PVOL01 to PVOL03. For example, for multipath volume PVOL01, the LUN of the volume of the partner enclosure with the enclosure identifier of "STORAGE_B_011" is "0," and the LV number is "VOL11."

Referring back to FIG. 7, the associating unit 703 controls the transmitting unit 706 to transmit physical information of the first volume to the storage apparatus 203. The associating unit 703 of the storage apparatus 203 associates and manages physical information of the first volume and that of the second volume.

The detecting unit 704 detects the start of copying data from the first volume to the second volume associated with each other. For example, the detecting unit 704 may detect the start of copying by detecting the start of data transfer to the storage apparatus 203. Further, for example, if a data copy instruction has been received, or if the first volume and the second volume are associated with each other, the detecting unit 704 may detect such cases as the start of copying of data.

The result of detection is stored in, for example, the volume state management table 600. In FIG. 8A(2), the copy flag, the session ID, and the copy direction are set for each of multipath volumes PVOL01 to PVOL03. For example, for multipath volume PVOL01, the session ID of a copy session between volume VOL01 on the transmission side and volume VOL11 on the reception side is "1."

The access control unit 705 controls access to the first and second volumes based on the result of detection. For example, when the start of copying is detected, the access control unit 705 controls the storage apparatus 203 to deny access to the second volume.

More specifically, the access control unit 705 controls the transmitting unit 706 to transmit an access denial request to deny access to the second volume to the storage apparatus 203. The access control unit 705 of the storage apparatus 203 performs control so that access to the second volume is denied.

The result of control is stored in, for example, the volume state management table 600. In FIG. 8B(3), the reference prohibiting flag and the update prohibiting flag are set to "ON" for each of multipath volumes PVOL01 to PVOL03. Thus, access to the second volume is prohibited upon the start of copying, thereby ensuring the safety of data that are being copied and preventing a data trouble.

The detecting unit 704 also detects the end of copying data from the first volume to the second volume associated with each other. For example, the detecting unit 704 may detect the end of copying by detecting the completion of data transfer. More specifically, the detecting unit 704 may detect the end of copying by receiving a notice of end of coping from the server 201 or the storage apparatus 203.

When the end of copying is detected, the access control unit 705 performs control so that access to the first volume is denied. More specifically, the access control unit 705 sets the reference prohibiting flags and the update prohibiting flags of volumes VOL01 to VOL03 to "ON" in the volume state management table 600 (see FIG. 8B(4)).

The access control unit 705 processes an access request (reference request, update request) to the first volume by referring to, for example, the volume state management table 600. For example, upon receiving a reference request to volume VOL01 from the application running on the server 201, the access control unit 705 checks the reference prohibiting flag of volume VOL01 in the volume state management table 600.

If the reference prohibiting flag of volume VOL01 is "OFF," the access control unit 705 permits access to volume VOL01 to allow the content thereof to be referred to. On the other hand, if the reference prohibiting flag of volume VOL01 is "ON," the access control unit 705 denies access to volume VOL01 and notifies the server 201 of an error.

When the end of copying is detected, the access control unit 705 also controls the storage apparatus 203 to permit access to the second volume. More specifically, the access control unit 705 transmits an access permission request to permit access to the second volume to the storage apparatus 203. The access control unit 705 of the storage apparatus 203 performs control so that access to the second volume is permitted.

The result of control is stored in, for example, the volume state management table 600. In FIG. 8B(4), the reference prohibiting flags and the update prohibiting flags of volumes VOL11 to VOL13 are set to "OFF" in the volume state management table 600.

Thus, upon the end of copying, access to the first volume is prohibited while access to the second volume is permitted, thereby ensuring the safety of data that have been copied and preventing a data trouble.

However, access (task) to the data to be transferred continues even in the time period from the detection of the end of copying to the denial of access to the first volume. Thus, if an asynchronous transfer method is employed, updating of the second volume may not be completed even after the completion of updating of the first volume.

In this case, updated data (address, size, data) of the first volume updated during the time period are transferred from the storage apparatus 202 to the storage apparatus 203 as data not yet transferred. Access (task) to the data to be transferred also continues in the time period from the denial of access to the first volume to the permission of access to the second volume.

In this case, if the first volume is accessed during the time period, the access control unit 705 controls the transmitting unit 706 to notify the server 201 (driver) of "logical shutdown due to migration in progress." The server 201 receives the notice and repeatedly retries the update request until "logical shutdown due to completion of migration" is notified from the storage apparatus 202. Thus, the first volume is prevented from being updated.

After the data not yet transferred are transferred to the storage apparatus 203, the access control unit 705 controls the storage apparatus 203 to permit access to the second volume. Thereafter, if the first volume is accessed, the access control unit 705 controls the transmitting unit 706 to notify the server 201 (driver) of "logical shutdown due to completion of migration."

The switching unit 406 of the server 201 sets a path for accessing the second volume to the active state as described above. The update request that has been retried until the notice of "logical shutdown due to completion of migration" is executed to the second volume.

Here, a mirroring method is adopted as the data copying method. For example, a snapshot method may be adopted as the data copying method. In this case, the copying control unit 702 starts a snapshot after performing control so that access to the second volume is denied.

The access control unit 705 performs control so that access to the first volume is denied. The access control unit 705 controls the storage apparatus 203 to permit access to the second volume.

Generally, when a multipath is configured, the server 201 checks whether physical information of the first volume and that of the second volume managed by the storage apparatus 202 and the storage apparatus 203 match with each other (uniqueness of volume), for prevention of erroneous operation. Here, the server 201 checks the uniqueness of volume using the physical information of the first volume and that of the second volume associated with each other by the associating unit 703.

For example, upon accepting a data transfer instruction, the server 201 inquires the destination storage apparatus 203 about the physical information of the second volume. In the inquiry, the server 201 notifies that the inquiry is made for checking the uniqueness to set an inter-enclosure multipath volume. In response to the inquiry, the storage apparatus 203 sends physical information associated with the physical information of the second volume to the server 201.

That is, the storage apparatus 203 sends the physical information of the first volume associated by the associating unit 703 to the server 201, instead of the physical information of the second volume. The server 201 checks the uniqueness of volume using the physical information sent from the storage apparatus 203 and the physical information of the first volume. In this case, the physical information of the first volume matches with that of the second volume.

On the other hand, if no physical information is associated with the physical information of the second volume, the storage apparatus 203 sends the physical information of the second volume to the server 201. In this case, the physical information of the first volume does not match with that of the second volume. Thus, the uniqueness of volumes constituting the multipath can be checked, thereby preventing an erroneous incorporation of volume and data destruction due to erroneous operation.

In the embodiment, the setting unit 404 of the server 201 controls access to the first and second volumes by setting the states of paths for accessing the first and second volumes. Alternatively, the processing performed by the setting unit 404 can be omitted since access to the first and second volumes is controlled on the side of the storage apparatuses 202 and 203. However, if access to the first and second volumes is controlled on the side of the server 201 as well, access to a volume for which access is denied on the side of the storage apparatuses 202 and 203 can be eliminated, thereby reducing error processing.

FIG. 9 is a diagram of an example of a task access during the data transfer. A task access is an access request issued from the application on the server 201 to the storage apparatus 202 when an event occurs.

(1) If the application on the server 201 requests access to the storage apparatus 202 before data transfer, the storage apparatus 202 sends a response to the access request to the application.

(2) If the application on the server 201 requests access to the storage apparatus 202 during data transfer, the storage apparatus 202 sends a response to the access request to the application.

(3) If the application on the server 201 requests access to the storage apparatus 202 after the time indicated by an asterisk in FIG. 9, the storage apparatus 202 notifies the driver on the server 201 of "logical shutdown due to migration in progress." The asterisk depicted in FIG. 9 represents the time at which the storage apparatus 202 prohibits access to the channel adaptors CA1 and CA2.

(4) Upon being notified of "logical shutdown due to migration in progress" from the storage apparatus 202, the driver on the server 201 retries the access request to the storage apparatus 202. (5) Upon detecting the completion of transmission of data not yet transferred, the storage apparatus 202 instructs the storage apparatus 203 to remove the prohibition of access to the channel adaptors CA3 and CA4. The storage apparatus 203 removes the prohibition of access to the channel adaptors CA3 and CA4.

(6) Upon being notified "logical shutdown due to completion of migration" from the storage apparatus 202, the driver on the server 201 sets paths P1, P2, and P4 to the stand-by state and sets path P3 to the active state. (7) When the driver on the server 201 retries the access request to the storage apparatus 203, the storage apparatus 203 sends a response to the access request to the application.

If access to the storage apparatus 202 is requested after (5), "logical shutdown due to migration in progress" is not notified from the storage apparatus 202 to the driver on the server 201.

Here, a case where data are transferred from volume VOL01 of the storage apparatus 202 to volume VOL11 of the storage apparatus 203 is described.

FIG. 10 is a flowchart of an exemplary procedure of the data transfer performed by the server. The input unit 401 determines whether an instruction to transfer data from volume VOL01 to volume VOL11 has been accepted (step S1001).

The data transfer instruction is waited for (step S1001: NO), and when the data transfer instruction is accepted (step S1001: YES), the setting unit 404 sets paths P3 and P4 for accessing volume VOL11 relative to paths P1 and P2 for accessing volume VOL01 (step S1002).

The setting unit 404 sets the state of path 1 to the active state, and sets the states of paths P2 to P4 to the stand-by state (step S1003). The recognizing unit 402 recognizes physical information of volumes VOL01 and VOL11 (step S1004).

The instructing unit 403 instructs the storage apparatus 202 to copy data from volume VOL01 to volume VOL11 (step S1005). The detecting unit 405 (command to configure an inter-enclosure multipath volume) determines whether the end of copying data from volume VOL01 to volume VOL11 is detected (step S1006).

The end of copying is waited for (step S1006: NO), and when the end of copying is detected (step S1006: YES), the flow proceeds to the next process.

After the application has issued an update request to the volume VOL1 (step S1007), the switching unit 406 (driver) issues an update request to volume VOL1 (step S1007). The switching unit 406 (driver) determines whether notification of "logical shutdown due to migration in progress" has been issued (step S1008). After an update request to volume VOL01 has been issued (step S1008) by the application after the end of copying, notification of "logical shutdown due to migration in progress" is issued by the storage apparatus 202 in response.

If notification of "logical shutdown due to migration in progress" has been issued (step S1008: YES), the procedure returns to step S1007. If notification other than "logical shutdown due to migration in progress" has been received at step S1008 (step S1008: NO), the procedure proceeds to step S1009.

The switching unit 406 (driver) determines whether notification of "logical shutdown due to completion of migration" has been issued (step S1009). If an update request to volume VOL01 is issued by the application after the permission of access to volume VOL11, a given update/reference, e.g., notification of "logical shutdown due to completion of migration" is issued by the storage apparatus 202 in response.

If notification of "logical shutdown due to completion of migration" has not been issued at step S1009 (step S1009: NO), "error processing" (step S1011) is performed, ending the procedure. On the other hand, if notification of "logical shutdown due to completion of migration" has been issued (step S1009: YES), the switching unit 406 controls the setting unit 404 to set path P3 to the active state and set paths P1, P2, and P4 to the stand-by state (step S1010), thereby ending the procedure according to the flowchart. Thus, the access path can be switched in coordination with the start and end of copying data from volume VOL01 to volume VOL11.

FIG. 11 is a flowchart of an exemplary procedure of the copying performed by the source storage apparatus 202. The accepting unit 701 determines whether an instruction to copy data from volume VOL01 to volume VOL11 of the storage apparatus 203 has been accepted (step S1101).

The data copy instruction is waited for (step S1101: NO), and when the data copy instruction is accepted (step S1101: YES), the access control unit 705 controls the transmitting unit 706 to transmit to the storage apparatus 203, an access denial request to deny access to volume VOL11 (step S1102). The detecting unit 704 detects the start of copying data from volume VOL01 to volume VOL11 (step S1103).

The copying control unit 702 starts copying data from volume VOL01 to volume VOL11 (step S1104). Subsequently, the detecting unit 704 determines whether the server 201 has given notification of the end of copying data from volume VOL1 to volume VOL11 (step S1105).

Notification of the end of data copying is waited for (step S1105: NO). When notification is given (step S1105: YES), the access control unit 705 sets the reference prohibiting flag and the update prohibiting flag to "ON" (step S1106).

The copying control unit 702 controls the transmitting unit 706 to transfer, to the storage apparatus 203 and as the data not yet transferred, the updated data of volume VOL01 updated during the time period from the end of copying to step S1107 (step S1107). The access control unit 705 also controls the transmitting unit 706 to transmit to the storage apparatus 203, an access permission request to permit access to volume VOL11 (step S1108), thereby ending the procedure according to the flowchart.

If volume VOL01 is accessed after step S1104, the access control unit 705 controls the transmitting unit 706 to notify the server 201 of "logical shutdown due to migration in progress." If volume VOL01 is accessed after step S1108, the access control unit 705 controls the transmitting unit 706 to notify the server 201 of "logical shutdown due to completion of migration."

Thus, access to volumes VOL01 and VOL11 can be controlled in coordination with the start and end of copying data from volume VOL01 to volume VOL11.

As described above, the storage apparatuses 202 and 203 according to the first embodiment can associate the first and second volumes configured over enclosures, and make the first and second volumes appear as a single multipath volume. The storage apparatuses 202 and 203 can control access to the first and second volumes in coordination with the start and end of copying data from the first volume to the second volume.

The storage apparatuses 202 and 203 can perform control so that access to the second volume is denied in coordination with the start of copying. Thus, access to the second volume can be prevented during the copying, thereby preventing a data trouble and ensuring the safety of data.

The storage apparatuses 202 and 203 can perform control so that access to the first volume is denied and access to the second volume is permitted in coordination with the end of copying, thereby preventing a data trouble from occurring at the end of copying and ensuring the safety of data.

According to the first embodiment described above, the first volume is accessed during the copying, and the access path is switched to the second volume in coordination with the end of copying, thereby enabling data transfer between enclosures without interrupting operation.

A data backup method according to a second embodiment of the present invention is described next. In the following, descriptions of portions similar to those of the first embodiment described above are omitted. First, a problem of the conventional backup method is described.

Conventionally, backup has to be performed again from scratch when data are transferred between enclosures during backup between enclosures. For example, in a backup of a large amount of data between remote enclosures, backup is usually performed by sending updated data (difference data) day by day.

When data are transferred between enclosures, the relation between the source enclosure and the backup enclosure is broken, thereby necessitating another backup from scratch. However, initial copying takes a long time for a large amount of data (for example, one to two weeks), during which the backup between enclosures cannot be performed and data that have been halfway updated are lost.

The backup method according to the second embodiment provides a method of handing over a session for backup between enclosures from the source enclosure to the destination enclosure without initial copying. FIG. 12 is a diagram of an example of the backup method.

A storage system 1200 includes the storage apparatus 202, the storage apparatus 203, and a storage apparatus 1201 that are connected via the network 210 such as a LAN, a WAN, a SAN, and the Internet.

Here, it is assumed that data are transferred from volume VOL01 of the storage apparatus 202 to volume VOL11 of the storage apparatus 203, and that data stored in volume VOL01 of the storage apparatus 202 are backed up to volume VOL21 of the storage apparatus 1201.

It is also assumed that data are being copied from volume VOL01 to volumes VOL11 and VOL21, respectively, and that compared to copying from volume VOL01 to volume VOL11, copying from volume VOL01 to volume VOL21 requires a longer time for completion.

According to the backup method, after the switching from volume VOL01 to volume VOL11 is completed according to the first embodiment, the storage apparatus 202 instructs the storage apparatus 203 to generate a virtual copy session between volume VOL11 and volume VOL21.

The virtual copy session merely associates volume VOL11 and volume VOL21, and does not copy data from volume VOL11 to volume VOL21. Thus, the generation of virtual copy session does not cause volumes VOL01 and VOL11 to transfer data simultaneously to volume VOL21, and thus does not cause data destruction.

(2) The storage apparatus 203 generates the virtual copy session between volume VOL11 and volume VOL21. Thereafter, the storage apparatus 203 holds updated data of volume VOL11 to reflect the updated data to volume VOL21. In other words, the generation of virtual copy session is equivalent to a request for holding the updated data.

(3) The storage apparatus 203 holds updated data of volume VOL11 for each update request to volume VOL11. That is, the storage apparatus 203 holds the content of updating of volume VOL11 (updated data) after the switching of access path from volume VOL01 to volume VOL11.

The updated data are managed by, for example, correlating each disk updating unit that is constituted by n consecutive blocks of memory area (hereinafter, "extent") to 1 bit, where n is a positive integer and the value of n is the same for both enclosures. That is, the n-th extent corresponds to the n-th bit. A bit corresponding to an updated extent becomes "ON," and a bit corresponding to the initial state at the generation of virtual copy session is "OFF."

(4) After the end of copying data from volume VOL01 to volume VOL21, the storage apparatus 203 transfers the updated data of volume VOL11 to the storage apparatus 1201. In the updated data, a bit corresponding to a transferred extent becomes "OFF."

Thus, according to the backup method, the switching of access path and the hand-over of backup is performed at a moment at which the contents of the source volume VOL01, the destination volume VOL11, and the backup volume VOL21 become temporarily the same, thereby making another backup from scratch unnecessary even when data are transferred during backup.

FIG. 13 is a sequence diagram of an exemplary procedure of the backup performed by the storage system 1200 according to the second embodiment.

The detecting unit 704 of the storage apparatus 202 detects the end of copying data from volume VOL01 to volume VOL11 (step S1301). When the end of copying is detected, the associating unit 703 of the storage apparatus 202 controls the transmitting unit 706 to transmit an instruction to generate a virtual copy session between volume VOL11 and volume VOL21 to the storage apparatus 203 (step S1302).

The associating unit 703 of the storage apparatus 203 associates volume VOL11 and volume VOL21 in response to the instruction to generate the virtual copy session (step S1303). The result of association is stored in, for example, a virtual copy session table 1300 depicted in FIG. 13.

Figure 14:
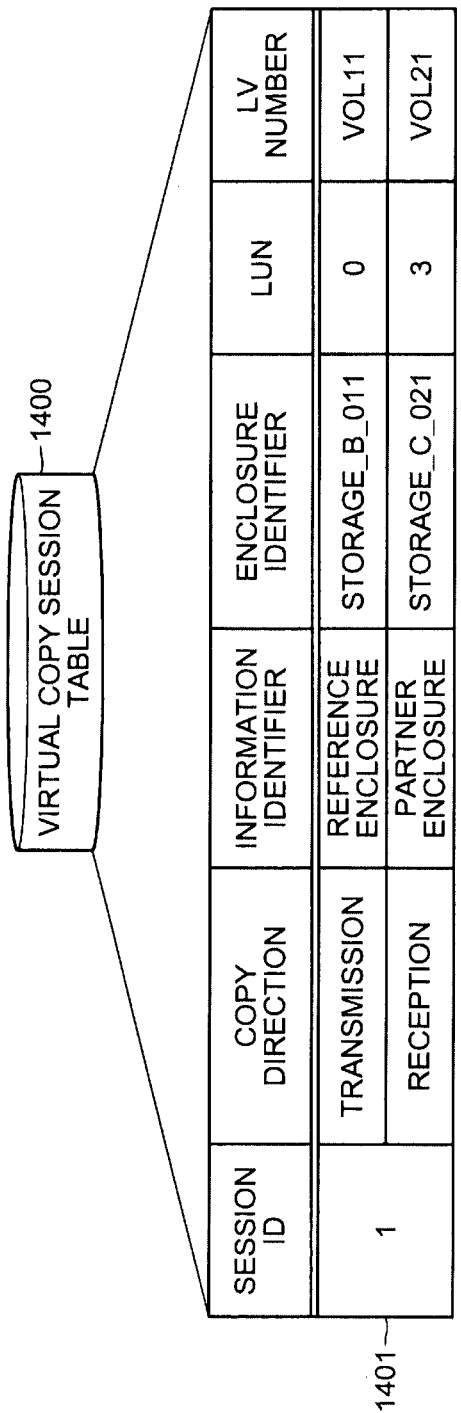
FIG. 14 is a diagram of an exemplary content of a virtual copy session table.

FIG. 14 is a diagram of an exemplary content of the virtual copy session table. The virtual copy session table 1400 includes fields of session ID, copy direction, information identifier, enclosure identifier, LUN, and LV number. Virtual copy session information 1401 is stored as a record, with each field being set with information.

The session ID is an identifier of the virtual copy session. The copy direction is information indicating whether the enclosure is on the transmission side or the reception side of data to be copied. The information identifier is an identifier of the reference enclosure or the partner enclosure. The enclosure identifier is an identifier of the storage apparatuses 203 and 1201. The LUN is an identifier of a volume recognized by an external computer (for example, the server 201). The LV number is an identifier of a volume recognized by the storage apparatuses 203 and 1201.

Here, a virtual copy session is generated between volume VOL11 and volume VOL21. Volume VOL11 is a volume of the reference enclosure with the enclosure identifier of "STORAGE_B_011," while volume VOL21 is a volume of the partner enclosure with the enclosure identifier of "STORAGE_C_021." Volume VOL11 is on the transmission side, while volume VOL21 is on the reception side.

Referring back to the sequence of FIG. 13, the access control unit 705 of the storage apparatus 202 performs control so that access to volume VOL01 is denied (step S1304). The access control unit 705 of the storage apparatus 202 controls the transmitting unit 706 to transmit the access permission request to permit access to volume VOL11 to the storage apparatus 203 (step S1305).

The access control unit 705 of the storage apparatus 203 performs control so that access to volume VOL11 is permitted in response to the access permission request (step S1306). As a result, the access path is switched from volume VOL01 to volume VOL11. Thereafter, the copying control unit 702 of the storage apparatus 203 holds updated data of volume VOL11 for each update request to volume VOL11 (step S1307).

The contents of volume VOL01 and volume VOL11 are the same at step S1304. However, the contents of volume VOL01 and volume VOL21 are not necessarily the same in the case of asynchronous transfer. Thus, data are not transferred from volume VOL11 to volume VOL21 until the end of copying data from volume VOL01 to volume VOL21. Meanwhile, only the updated data are held at step S1307.

The detecting unit 704 of the storage apparatus 202 detects the end of copying data from volume VOL01 to volume VOL21 (step S1308). The copying control unit 702 of the storage apparatus 202 terminates (or temporarily suspends in consideration of operations for recovery from failure) the copy session between volume VOL01 and volume VOL21 (step S1309).

The copying control unit 702 of the storage apparatus 202 controls the transmitting unit 706 to transmit an instruction to copy the updated data from volume VOL11 to volume VOL21 to the storage apparatus 203 (step S1310). In response to the updated-data copy instruction, the copying control unit 702 of the storage apparatus 203 controls the transmitting unit 706 to transfer the updated data held at step S1307 to the storage apparatus 1201 (step S1311).

The start of the updated-data transfer may be notified to the storage apparatus 202 at step S1311. In this case, the storage apparatus 202 checks and suspends a remaining copy session (if any) between volume VOL01 and volume VOL21.

The updated-data copy instruction is automatically transmitted to the storage apparatus 203 at step S1301. Alternatively, a user may issue the updated-data copy instruction to the storage apparatus 203 at any timing, in consideration of recovery from an abnormal condition.

The copy session between volumes can be managed by, for example, using the volume state management table 600 depicted in FIG. 6. Specifically, the copy flag of a terminated (or suspended) copy session between volumes is changed from "ON" to "OFF."

The storage apparatuses 202, 203, and 1201 according to the second embodiment described above can associate the second (destination) volume and the third (backup) volume and generate a virtual copy session therebetween, before the permission of access to the second volume. The storage apparatuses 202, 203, and 1201 can also transfer the updated data of the second volume to the third volume in coordination with the end of copying data from the first (source) volume to the third (backup) volume.

Thus, another backup from scratch becomes unnecessary even when data transfer occurs during backup, thereby reducing the time required for initial synchronization of mirroring, and preventing an increased amount of data from being lost in a disaster.

A data backup method according to a third embodiment of the present invention is described next. In the following, descriptions of portions similar to those of the first and second embodiments described above are omitted.

In the third embodiment, the access path is switched at a moment at which the contents of the source volume VOL01 and the destination volume VOL11 become temporarily the same. Information on the data not yet transferred from the source volume VOL01 to the backup volume VOL21 is handed over to the destination volume VOL11.

The information on the data not yet transferred is transmitted from the destination volume VOL11 to the backup volume VOL21. The information on the data not yet transferred is constituted by, for example, physical information of the backup volume VOL21 and a pair of the head address of and the number of the logical blocks in which the data not yet transferred are stored.

FIG. 15 is a sequence diagram of an exemplary procedure of the backup according to the third embodiment.

It is assumed that the copying control unit 702 of the storage apparatus 202 is copying data from volume VOL01 to volume VOL21 of the storage apparatus 1201 (step S1501). The copying control unit 702 of the storage apparatus 202 starts copying data from volume VOL01 to volume VOL11 of the storage apparatus 203 (step S1502).

The associating unit 703 of the storage apparatus 202 associates the copying from volume VOL01 to volume VOL11 and the copying from volume VOL11 to volume VOL21 (step S1503). The result of association is stored in, for example, the volume state management table 600 depicted in FIG. 6.

The detecting unit 704 of the storage apparatus 202 detects the end of copying data from volume VOL01 to volume VOL11 (step S1504). The access control unit 705 of the storage apparatus 202 performs control so that access to volume VOL01 is denied (step S1505).

The copying control unit 702 of the storage apparatus 202 stops the copying from volume VOL01 to volume VOL21 (step S1506). The associating unit 703 of the storage apparatus 202 transmits an instruction to generate a virtual copy session between volume VOL11 and volume VOL21 to the storage apparatus 203, based on information regarding copy sessions and stored in the volume state management table 600 (step S1507).

The associating unit 703 of the storage apparatus 203 associates volume VOL11 and volume VOL21 in response to the instruction to generate the virtual copy session (step S1508). The result of association is stored in, for example, the virtual copy session table 1400 depicted in FIG. 14.

The copying control unit 702 of the storage apparatus 202 transmits, to the storage apparatus 203, information on the data not yet transferred to the storage apparatus 1201 among the data stored in volume VOL01 (step S1509).

The receiving unit 707 of the storage apparatus 203 receives the information from the storage apparatus 202, and manages the information as information on data not yet transferred to volume VOL21 (step S1510). The copying control unit 702 of the storage apparatus 203 transmits to the storage apparatus 1201, the data of volume VOL21 not yet transferred (step S1511).

The data not yet transferred received at step S1510 is managed, for example, in association with the session ID of the virtual copy session generated between volume VOL11 and volume VOL21.

The storage apparatus 202 according to the third embodiment can associate the first, second, and third volumes with each other and stop copying data from the first volume to the third volume upon completion of copying from the first volume to the second volume. The storage apparatus 202 can also transfer data not yet transferred from the first volume to the third volume to the storage apparatus 1201 via the storage apparatus 203.

Thus, another backup from scratch becomes unnecessary even when data transfer occurs during backup, thereby reducing the time required for initial synchronization of mirroring, and preventing an increased amount of data from being lost in a disaster.

The data transfer method explained in the present embodiments can be implemented by a computer, such as a personal computer and a workstation, executing a program that is prepared in advance. The data transfer program is recorded on a computer-readable recording medium such as a hard disk, a flexible disk, a CD-ROM, an MO, and a DVD, and is executed by being read out from the recording medium by a computer. The data transfer program can be distributed through a network such as the Internet.

According to the storage apparatus and the storage system, data can be transferred between enclosures without interrupting access to the data to be transferred.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage apparatus comprising:
an associating unit that associates a first memory area in which data to be copied are stored and a second memory area of a destination storage apparatus to which the data are copied;
a copying control unit that controls copying the data from the first memory area to the second memory area associated;
a detecting unit that detects a start or an end of the copying;
an access control unit that controls access to the first memory area and the second memory area based on a result of detection performed by the detecting unit,
wherein the associating unit associates the second memory area and a third memory area of a backup storage apparatus to which the data is backed up,
the detecting unit detects an end of copying the data from the first memory area to the third memory area to which the second memory area is associated, and
the copying control unit controls the destination storage apparatus to copy updated data to the third memory area when the end of copying from the first memory area to the third memory area is detected, the updated data being obtained by accessing the second memory area and updating the data.

2. The storage apparatus according to claim 1, wherein the access control unit controls the destination storage apparatus to deny access to the second memory area when the start of copying is detected by the detecting unit.

3. The storage apparatus according to claim 1, wherein the access control unit performs control so that access to the first memory area is denied and controls the destination storage apparatus to permit access to the second memory area when the end of copying is detected by the detecting unit.

4. The storage apparatus according to claim 1, wherein
the associating unit associates the first memory area, the second memory area, and the third memory area, and
when an end of copying the data from the first memory area to the second memory area associated by the associating unit is detected by the detection unit, the copying control unit stops copying the data from the first memory area to the third memory area and controls the destination storage apparatus to copy data not yet copied from the first memory area to the third memory area to the third memory area.

5. A storage system comprising:
a source storage apparatus;
a destination storage apparatus; and
an information processing apparatus capable of accessing the source storage apparatus and the destination storage apparatus,
wherein the source storage apparatus includes:
an associating unit that associates a first memory area in which data to be copied are stored and a second memory area of the destination storage apparatus to which the data are copied;
a copying control unit that controls copying the data from the first memory area to the second memory area associated;
a detecting unit that detects a start or an end of the copying; and
an access control unit that controls access to the first memory area and the second memory area based on a result of detection performed, and
wherein the associating unit associates the second memory area and a third memory area of a backup storage apparatus to which the data is backed up,
the detecting unit detects an end of copying the data from the first memory area to the third memory area to which the second memory area is associated, and
the copying control unit controls the destination storage apparatus to copy updated data to the third memory area when the end of copying from the first memory area to the third memory area is detected, the updated data being obtained by accessing the second memory area and updating the data.

6. The storage system of claim 5, wherein the information processing apparatus switches an access path from the first memory area to the second memory area based on a result of control of the access to the first memory area and the second memory area performed by the access control unit.

\* \* \* \* \*